United States Patent [19]
Imhof et al.

[11] Patent Number: 4,805,932
[45] Date of Patent: Feb. 21, 1989

[54] JOINT SECURED AGAINST SLIDING

[75] Inventors: Erich Imhof; Manfred Vorbeck, both of Laufach, Fed. Rep. of Germany

[73] Assignee: Eisenwerke Friedrich Wilhelm Duker GmbH & Co., Karlstadt, Fed. Rep. of Germany

[21] Appl. No.: 21,881

[22] Filed: Mar. 4, 1987

[30] Foreign Application Priority Data

Mar. 5, 1986 [DE] Fed. Rep. of Germany ....... 3607268

[51] Int. Cl.$^4$ ............................................. F16L 21/04
[52] U.S. Cl. .......................................... 285/4; 285/104; 285/232; 285/322; 285/339
[58] Field of Search ................... 285/3, 4, 232, 231, 285/339, 322, 374, 104, 105, 230, 233, 234

[56] References Cited

U.S. PATENT DOCUMENTS

| | | | |
|---|---|---|---|
| 2,116,705 | 5/1938 | Marx et al. | 285/374 X |
| 2,596,182 | 5/1952 | Sosaya | 285/3 |
| 3,384,392 | 5/1968 | Gilchrist | 285/105 |
| 3,899,183 | 8/1975 | Wild et al. | 285/231 X |
| 3,963,298 | 6/1976 | Seiler | 285/231 X |
| 4,212,486 | 7/1980 | Logsdon | 285/4 |
| 4,293,149 | 10/1981 | Bonel | 285/322 X |
| 4,623,170 | 11/1986 | Cornwall | 285/4 |

FOREIGN PATENT DOCUMENTS

| | | | |
|---|---|---|---|
| 2105144 | 9/1971 | Fed. Rep. of Germany | 285/231 |
| 2034325 | 1/1972 | Fed. Rep. of Germany | |
| 2754984 | 6/1979 | Fed. Rep. of Germany | 285/105 |

Primary Examiner—Randolph A. Reese
Assistant Examiner—Anthony Knight
Attorney, Agent, or Firm—Holman & Stern

[57] ABSTRACT

A spigot-and-socket joint which is secured against pulling apart, particularly for socket pipes manufactured by centrifugal casting or molding, wherein the spigot end of one pipe is pushed into the socket end of another pipe, with radial play, comprises a sealing ring and a gripping ring in the socket pipe, the gripping ring comprising a plurality of gripping segments mutually spaced circumferentially and each having a spherically convex radially outer surface and being interconnected in the circumferential direction by a vulcanized intermediate piece of rubber or the like, and a toothed configuration on the radially inner surface, so that when axial tensile forces arise at the joint, the toothed configurations are pressed radially inwardly against the spigot end by interaction of the spherically convex surfaces with an interior conical surface of the pipe socket which interior surface narrows in the direction of the distal end of the socket. In order to effectively eliminate relative radial movements of the gripping ring when the joined pipes are first subject to interior fluid pressure, an elastomeric holding piece is formed on the gripping ring, which gripping ring is separate from the sealing ring, the holding piece being attached to the distal end face of the socket and supporting the gripping ring.

26 Claims, 3 Drawing Sheets

JOINT SECURED AGAINST SLIDING

BACKGROUND OF THE INVENTION

1. Field of the Invention

The present invention relates to a spigot-and-socket joint which is secured against sliding, in particular, against pulling apart, particularly for socket pipes manufactured by a centrifugal casting method, in which joint the spigot end of one pipe can be pushed into the socket end of the other pipe, with radial play, wherein a sealing ring and a gripping ring are disposed in the joint, which gripping ring is comprised of a plurality of gripping segments mutually spaced in the circumferential direction, which gripping segments has a spherically convex exterior surface and are interconnected in the circumferential direction by a vulcanized intermediate piece (sheet or the like) comprised of rubber or the like, and which gripping segments have a toothed configuration on their radially interior surface, whereby said gripping segments press radially against the spigot end when axial tensile forces arise, said radial pressing being generated by the interaction of the spherically convex exterior surfaces with an interior surface of the pipe socket which interior surface narrows conically as the distal end of the socket is approached.

2. Description of the Prior Art

In a known spigot-and-socket joint of this type (West German Pat. No. 2,034,325), the sealing ring is connected to the gripping ring, particularly in the region of the intermediate pieces between the gripping segments, whereby a solid structural component is formed. In order to enable a relative longitudinal movement of the spigot end with respect to the unit comprising the gripping ring and sealing ring, when the spigot end is being inserted into the socket end, a rearward-facing shoulder is provided in the interior of the socket, against which shoulder the sealing ring comes to rest and which receives the axial forces which occur during said longitudinal movement, said forces being reflected in a compression of the sealing ring. In a refinement of this arrangement, a middle shoulder is provided against which the gripping ring is forced via corresponding shoulders provided on the gripping segments, so that the sealing ring, which in this case is suspended on the gripping ring, becomes more or less elongated in the axial direction. In both cases, after the spigot end is inserted into the socket end there is a relatively large distance between the spherically convex exterior surface of the gripping segments and the interior surface of the pipe socket, which latter surface narrows conically as the distal end of the socket is approached. The first time interior pressure is applied to the pipes which are now joined, the unit comprising the gripping ring and sealing ring must cover a corresponding axial distance before the gripping ring with its gripping segments arrives at its proper gripping position in which the toothed configuration comprising wedge-shaped teeth, which act in the radial direction, can grip firmly under the compressive action of the spigot end, by which firm grip of the teeth it is assured that the pipe joint will be secure from sliding. It has been found that due to the sudden axial pressure which accompanies any relative displacement of the pipes, there is a tendency for substantial withdrawal from the socket.

The object of the present invention is to overcome the above problem and provide a spigot-and-socket joint of the anti-sliding type described supra, whereby in relatively simple and reliable fashion the gripping ring with its gripping segments can be positioned problem-free with respect to the conical interior surface of the socket and the exterior surface of the spigot end.

SUMMARY OF THE INVENTION

This object is achieved by the inventive spigot-and-socket joint of this invention which is distinguished essentially in that an elastomeric holding piece is formed on the gripping ring, which gripping ring is separate from the sealing ring, whereby the holding piece can be attached to the distal end face of the socket and supports the gripping ring. When the holding piece is installed on the socket end it holds the gripping ring in a position near the distal end face of the socket. When the spigot end of the other pipe being joined is inserted in the socket, the gripping ring is moved axially to a greater or lesser degree from the aforesaid position, depending on the dimensional tolerances. When the insertion takes place, the gripping ring, via its gripping segments, immediately comes into active engagement with the conical interior surface of the socket, and via its toothed configuration it immediately comes into active engagement with the exterior surface of the spigot end; and said gripping ring remains in this position until the first time the pipes are acted on by interior fluid pressure. At that time the gripping ring immediately performs its essential gripping function without any appreciable delay.

Because under this arrangement the sealing ring is a separate structural unit from the gripping ring, and has its own sealing chamber in which it is housed in the socket, it is possible to use a sealing ring of practically any of the commercially available spigot-and-socket joint systems ("Tyton", "von Roll", "Standard", "Super-Bell", etc.) in connection with the separate unit according to the invention, comprising the gripping ring which is joined to the holding piece.

It has turned out to be particularly advantageous from the standpoint of simple and secure handling if the holding piece, which is formed by a collar, has a ring-shaped cylindrical segment which rests on the exterior side of the end of the socket; further has a ring-shaped disc segment which rests on the distal end face of the socket and adjoins the ring-shaped cylindrical segment; and has a connecting segment which may be conically narrowing and which is expansible along with the gripping ring and in particular is flexible and/or expandible in the axial direction in which flexure or expansion takes place to a degree depending on the exterior dimensions of the spigot end which is to be inserted.

The thus-configured collar can be conveniently attached to the end of the socket by merely sliding it over the socket end. Moreover, its conically narrowing connecting segment enables a funnel-like introduction of the spigot end to be carried out wherein the connecting segment expands to the degree necessary to pass the spigot end to and through the gripping ring, which gripping ring follows immediately after the connecting segment in the insertion path of the spigot end and is similarly expanded. As soon as the gripping segments come into position against the conical interior surface of the end of the socket, they are secured against the exterior wall of the spigot end which has been inserted, which securing is of a particularly advantageous nature and takes place automatically due to the positional constraints.

Certain legal requirements in some localities forbid electrical conductivity between pipes. Accordingly, it is proven advantageous if the connecting segment of the collar is provided with an insulating coating on the spherically convex surface of the gripping ring, which surface faces the conically narrowing interior surface of the socket end. This coating serves to insulate the two pipes which are joined. Advantageously, it is comprised of an elastomer layer; however, it may alternatively be comprised of a glass fiber reinforced plastic layer.

As a further refinement, it has proved very advantageous for a cover to be disposed on the collar, to protect the interior of the pipe from foreign bodies or soils. Particularly when pipes are being installed which have interior cementing, such a cover is useful, because soiling leads to major cleaning problems in such cases. The configuration of the cover may be very simple, namely that of a flat elastic membrane. However, such a membrane presents a risk of being damaged. Accordingly, it has proven advantageous for the cover to have a bag-like configuration, which provides a problem-free and secure cover which is not subject to unintended damage. Then even if an object such as a foot pokes against the end region of the pipe bearing the cover, the cover is not damaged, because the bag configuration is disposed in the interior of the pipe, and the wall of the bag is not a flat membrane and suffers minimal stress if struck accidentally by a foot.

BRIEF DESCRIPTION OF THE DRAWINGS

Additional details, advantages, and features of the invention will be apparent from the following description and from the accompanying drawings, in which explicit reference is made for the purpose of disclosure of all details not described in the text and wherein.

DETAILED DESCRIPTION OF THE INVENTION

Figure 1:
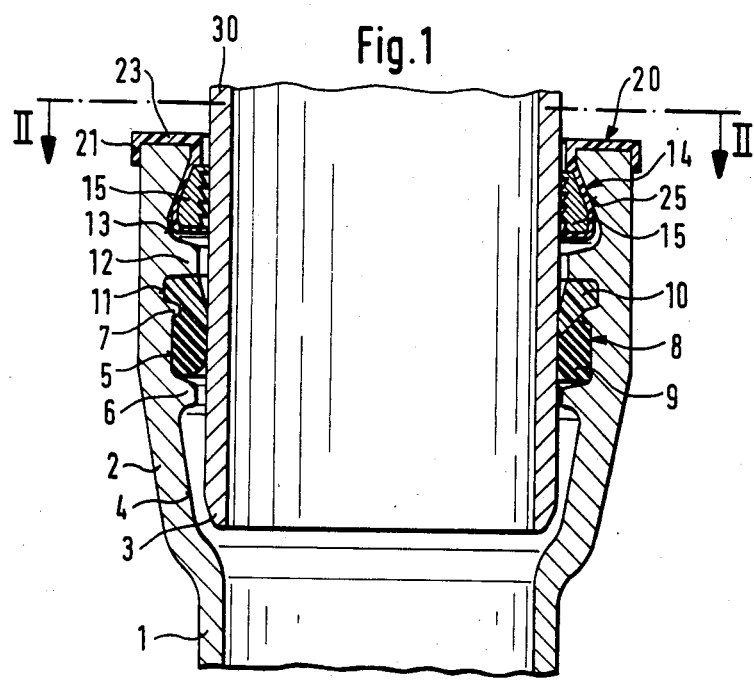
FIG. 1 is a longitudinal cross-sectional view through the spigot end of a pipe with the socket end of an adjoining pipe being engaged with the said spigot end according to the invention.
Figure 2:
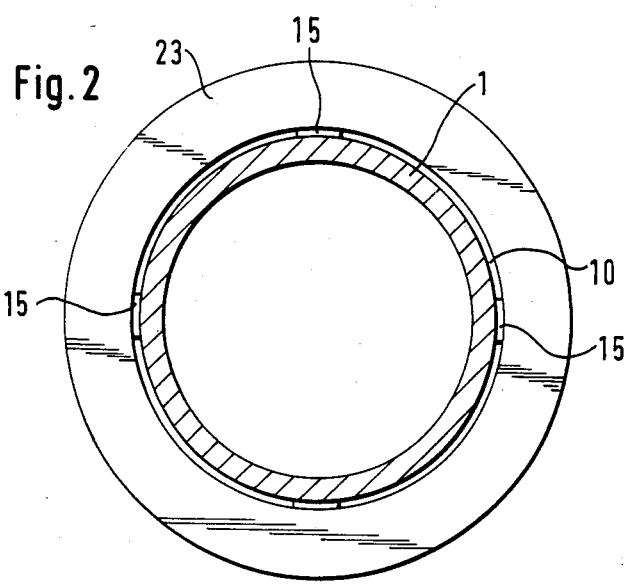
FIG. 2 is a cross-sectional view taken along line II—II of FIG. 1.

As seen from the drawings, a pipe 1 has a socket on its socket end 2. A spigot end 3 of an adjoining pipe 30 can be inserted in the socket 2, with radial play. A recess 4 is provided in the interior of the socket, which recess allows the two pipes 1, 30 to swing with respect to each other, over a limited range. A sealing chamber 5 adjoins recess 4, which chamber 5 is bounded axially outwardly by a radially extending inner shoulder 6 on the socket end 2. A ring-shaped bead 7 is located in the region of chamber 5, at a distance from shoulder 6. The bead 7 serves to hold in place a sealing ring 8 which has a head section 9 comprised of a soft elastomer material and a foot section 10 comprised of a harder elastomer material. This foot section 10 is disposed in a ring-shaped groove 11 bounded on one side by the ring-shaped bead 7 and on the other by an abutting shoulder 12. Ring 8 is thereby held in position, and remains in the position illustrated even as the spigot end 3 is inserted in the socket end 2 with deformation of the head section 9. A locking chamber 13 is disposed between the abutting shoulder 12 and the distal end of the socket 2. Chamber 13 serves to accommodate a gripping ring 14 which is comprised of a plurality (in the illustration, four) of gripping segments 15 disposed at a distance apart in the circumferential direction. Segments 15 are interconnected in the circumferential direction by respective intermediate pieces 16 comprised of rubber material or the like. Segments 15 each have a spherically convex outer surface 17 on their side directed toward the wall of the locking chamber 13. This surface 17 interacts with the interior surface 18 of the socket which surface narrows conically as the distal end is approached, whereby as a result of such interaction the toothed configuration 19 on the interior surface of each of the gripping segments 15 is pressed radially inwardly against the spigot end 3 when axial tensile forces are present which tend to disengage the joint.

Figure 3:
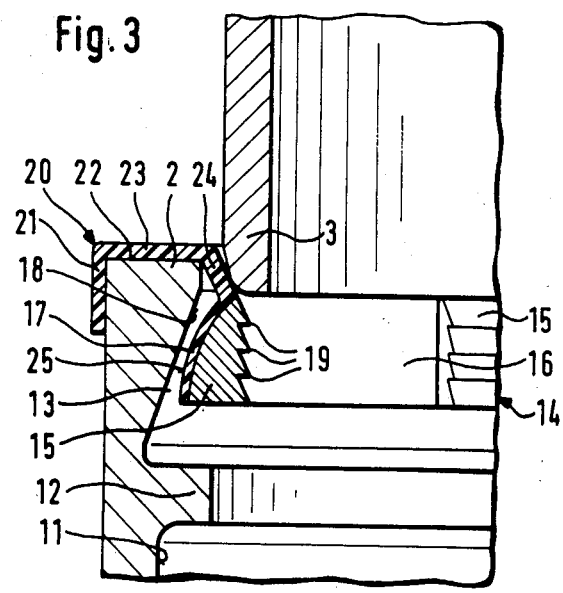
FIG. 3 is an enlarged longitudinal cross-sectional detail view of a portion of FIG. 1.

As may be seen particularly clearly from FIG. 3, a collar 20 comprised of elastomer material is formed on the gripping ring 14, which collar supports the ring 14 and can be attached to the end face of the socket. The collar 20 comprises a ring-shaped cylindrical segment 21 which is intended to rest against the exterior side of the socket end 2; the collar further comprises a segment 23 having a ring-shaped disc shape, which segment 23 adjoins segment 21 and is intended to rest against the end face 22 of the socket; and further comprises a connecting segment 24 which may have a conically narrowing configuration and which extends from the interior edge of the end face of the socket to the gripping ring 14. The dimensions of this connecting segment depend on the exterior dimensions of the spigot end 3 which is to be inserted in the socket, along with the dimensions of the gripping ring 14, and the connecting segment is flexible and/or expandable in the axial direction.

It may further be seen from FIG. 3 that the connecting segment 24 of the collar 20 is provided with an insulating coating 25 on the spherically convex surface 17 of the gripping ring 14 which surface faces the conically narrowing interior surface 18 of the end of the socket 2. The coating 25 serves to mutually insulate the pipes which are being joined. It may comprise an elastomer layer. Preferably it comprises a glass-fiber-reinforced plastic layer.

Figure 4:
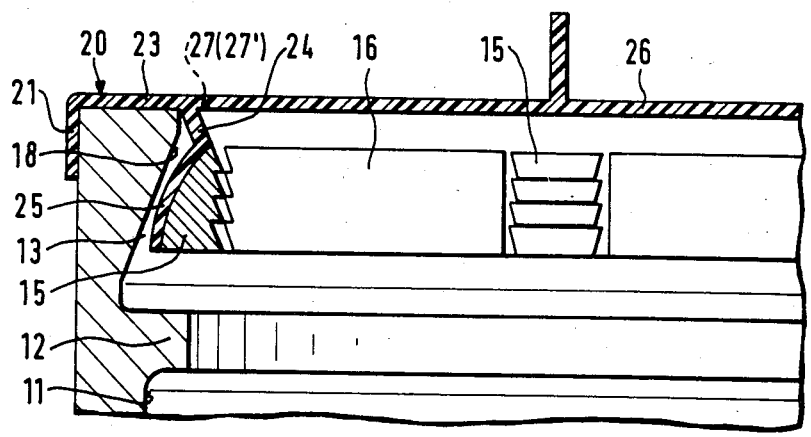
FIG. 4 is an enlarged partial longitudinal cross-sectional view through the distal end of the socket with its collar applied, along with the cover which is integral with said collar.
Figure 6:
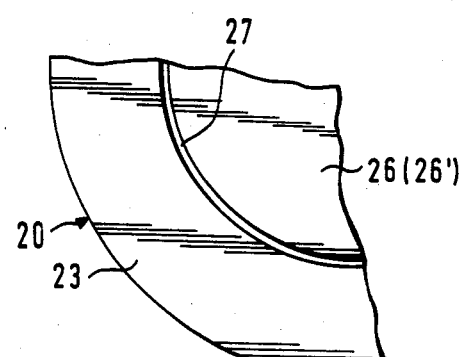
FIG. 6 is a reduced top plan view of a segment of FIG. 4 showing one form of frangible means.
Figure 7:
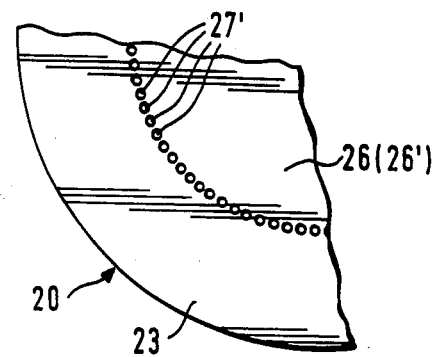
FIG. 7 is a view similar to FIG. 6 showing a different embodiment of frangible means.
Figure 5:
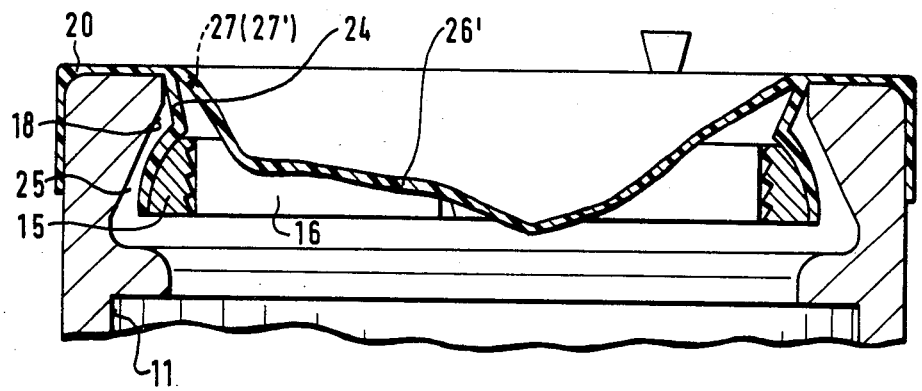
FIG. 5 is a view similar to FIG. 4 showing a different embodiment of a cover.

As seen from FIG. 4, a cover 26 is formed on the collar 20, which cover protects the interior of the pipe against entry of foreign bodies or soils. In the embodiment illustrated in FIG. 4 the cover is in the form of a flat elastic membrane 26. Alternatively, the cover may be in the form of a bag 26' as shown in FIG. 5. It is also seen from FIGS. 4, and 5 that a reduced thickness portion, or perforation, 27, 27' as shown in FIGS. 6 and 7 is provided in the cover material in the region of the collar 20 adjacent segment 23, which enables one to easily tear away, or cut away, the cover 26 immediately before installation. In this way, one can effectively avoid soiling the interior of the pipe and the molded pieces during transportation of them to the construction site.

We claim:

1. A spigot-and-socket joint for pipes, wherein a spigot end of a pipe is inserted into a socket end of another pipe, comprising:
   a socket end on a pipe having a larger diameter than the spigot end for providing radial play between said socket end and spigot end;
   a sealing ring in said socket end between said socket end and spigot end;
   an interior surface portion on said socket end defining a gripping ring chamber and having a substantially conical configuration which is narrower in the direction of the distal end of said socket end;
   a separate gripping ring in said gripping ring chamber, said gripping ring comprising
      a plurality of gripping segments in circumferentially spaced relationship,
      intermediate pieces of resiliently deformable material interconnecting said gripping segments,
      a substantially spherically convex radially outer surface on each gripping segment engageable with said conical interior surface portion, and
      a radially inner surface on each gripping segment having a toothed configuration engageable with said spigot end, so that axial force in the direction of separation of said socket end and inserted spigot end causes said gripping segments to be pressed radially inwardly against said spigot end by interaction between said conical interior surface portion of said socket end and said outer surfaces of said gripping segments for retaining said spigot end in said socket end against said axial force;
   an elastomeric collar on said gripping ring attached on the distal end of said socket end; and
   a connecting part connecting said collar to said gripping ring for supporting said gripping ring and facilitating expansible movement of said gripping segments during insertion of said spigot end into said socket end.

2. A spigot-and-socket joint as claimed in claim 1 wherein:
   the distal end face of said socket end has a radially inner edge, and a radially outer side;
   said collar comprises
      a ring shaped disc part engaging said end face of said socket end;
      a ring-shaped cylindrical part adjoining said disc part and engaging said radially outer side of said socket end, and
      said connecting part;
   said connecting part being substantially conical and extending substantially from said radially inner edge of said distal end face to said gripping ring and having the smaller diameter portion thereof at said gripping ring to provide a gradually narrowing open end on said socket end through which said spigot end is inserted, and being expansible with said gripping ring and axially expansible to facilitate insertion of said spigot end into said socket end.

3. A spigot-and-socket joint as claimed in claim 2 and further comprising:
   an insulating coating on said outer surface of each gripping segment for insulating said spigot end from said socket end.

4. a spigot-and-socket joint as claimed in claim 3 wherein:
   said insulating coating comprises a layer of elastomeric material.

5. A spigot-and-socket joint as claimed in claim 3 wherein:
   said insulating coating comprises a layer of glass fiber reinforced plastic material.

6. A spigot-and-socket joint as claimed in claim 3 wherein:
   said insulating coating comprises an axially extending part of said connecting part of said collar.

7. A spigot-and-socket joint as claimed in claim 6 wherein:
   said insulating coating comprises a layer of elastomeric material.

8. A spigot-and-socket joint as claimed in claim 7 and further comprising:
   a cover portion on said collar extending over the end of said socket end prior to insertion of said spigot end for protecting the interior of said socket end against entry of foreign material.

9. A spigot-and-socket joint as claimed in claim 6 wherein:
   said insulating coating comprises a layer of glass fiber reinforced plastic material.

10. A spigot-and-socket joint as claimed in claim 9 and further comprising:
    a cover portion on said collar extending over the end of said socket end prior to insertion of said spigot end for protecting the interior of said socket end against entry of foreign material.

11. A spigot-and-socket joint as claimed in claim 10 wherein:
    said cover portion comprises a flat elastic membrane.

12. A spigot-and-socket joint as claimed in claim 11 and further comprising:
    frangible means on said cover portion substantially adjacent said distal end of said socket end so that said cover can be easily torn away.

13. A spigot-and-socket joint as claimed in claim 1 and further comprising:
    a cover portion on said collar extending over the end of said socket end prior to insertion of said spigot end for protecting the interior of said socket end against entry of foreign material.

14. A spigot-and-socket joint as claimed in claim 13 wherein:
    said cover portion comprises a flat elastic membrane.

15. A spigot-and-socket joint as claimed in claim 3 and further comprising:
    frangible means on said cover portion substantially adjacent said distal end of said socket end so that said cover can be easily torn away.

16. A spigot-and-socket joint as claimed in claim 15 wherein:
    said frangible means comprises perforation means.

17. A spigot-and-socket joint as claimed in claim 15 wherein:
    said frangible means comprises a reduced thickness portion.

18. A spigot-and-socket joint as claimed in claim 13 wherein:
    said cover portion has a bag-like shape.

19. A spigot-and-socket joint as claimed in claim 18 and further comprising:

frangible means on said cover portion substantially adjacent said distal end of said socket end so that said cover can be easily torn away.

20. A spigot-and-socket joint as claimed in claim 19 wherein:
said frangible means comprises perforation means.

21. A spigot-and-socket joint as claimed in claim 1 wherein:
said connecting part comprises an elastomeric material.

22. A spigot-and-socket joint as claimed in claim 21 wherein:
said connecting part is integral with said collar.

23. A spigot-and-socket joint as claimed in claim 2 wherein:
said connecting part comprises an elastomeric material.

24. A spigot-and-socket joint as claimed in claim 23 wherein:
said connecting part is integral with said collar.

25. A spigot-and-socket joint as claimed in claim 8 wherein:
said connecting part comprises an elastomeric material.

26. A spigot-and-socket joint as claimed in claim 25 wherein:
said connecting part is integral with said collar.

* * * * *